(12) United States Patent
Murakami et al.

(10) Patent No.: US 7,570,422 B2
(45) Date of Patent: Aug. 4, 2009

(54) DISPLAY DEVICE, MULTI-SCREEN DISPLAY DEVICE, AND DISPLAY DEVICE MANUFACTURING METHOD

(75) Inventors: Kosaku Murakami, Tokyo (JP); Sadakazu Tomita, Tokyo (JP); Hidekazu Kodera, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 528 days.

(21) Appl. No.: 11/283,900

(22) Filed: Nov. 22, 2005

(65) Prior Publication Data

US 2006/0256432 A1 Nov. 16, 2006

(30) Foreign Application Priority Data

May 13, 2005 (JP) ............................. 2005-140896

(51) Int. Cl.
*G03B 21/56* (2006.01)
(52) U.S. Cl. ........................................ 359/443; 359/900
(58) Field of Classification Search ................ 359/443, 359/460, 455–456, 894, 900
See application file for complete search history.

(56) References Cited

U.S. PATENT DOCUMENTS

| 5,317,449 | A | * | 5/1994 | Furuno et al. | ............... 359/443 |
| 6,327,082 | B1 | * | 12/2001 | Browning | ................... 359/443 |
| 6,348,993 | B1 | * | 2/2002 | Hori | ............................ 359/443 |
| 6,618,196 | B2 | * | 9/2003 | Ikari et al. | ................... 359/457 |
| 6,710,941 | B2 | * | 3/2004 | Hennen et al. | ............... 359/742 |
| 2003/0070830 | A1 | * | 4/2003 | Kondo et al. | ................ 174/68.1 |

FOREIGN PATENT DOCUMENTS

| JP | 2000-162709 A | 6/2000 |
| JP | 2001-125201 A | 5/2001 |
| JP | 2001-209129 A | 8/2001 |
| JP | 2004-292247 A | 10/2004 |

* cited by examiner

*Primary Examiner*—Christopher Mahoney
(74) *Attorney, Agent, or Firm*—Birch, Stewart, Kolasch & Birch, LLP

(57) ABSTRACT

In an image-displaying screen that is formed of a plurality of plates having lens structure, the reliability of the fixing between the plurality of plates is enhanced. A screen that displays an image includes a lenticular lens plate and a Fresnel lens plate that is fixed to the lenticular lens plate by thermal welding. Because the lenticular lens plate and the Fresnel lens plate are thus fixed together by thermal welding, the fixing strength between the lenticular lens plate and the Fresnel lens plate is not deteriorated by repeated distortion of the welded portion, as would be caused by temperature variations etc. when a welding agent is used to fix them. This enhances the reliability of the fixing between the lens plates.

12 Claims, 12 Drawing Sheets

F I G . 2
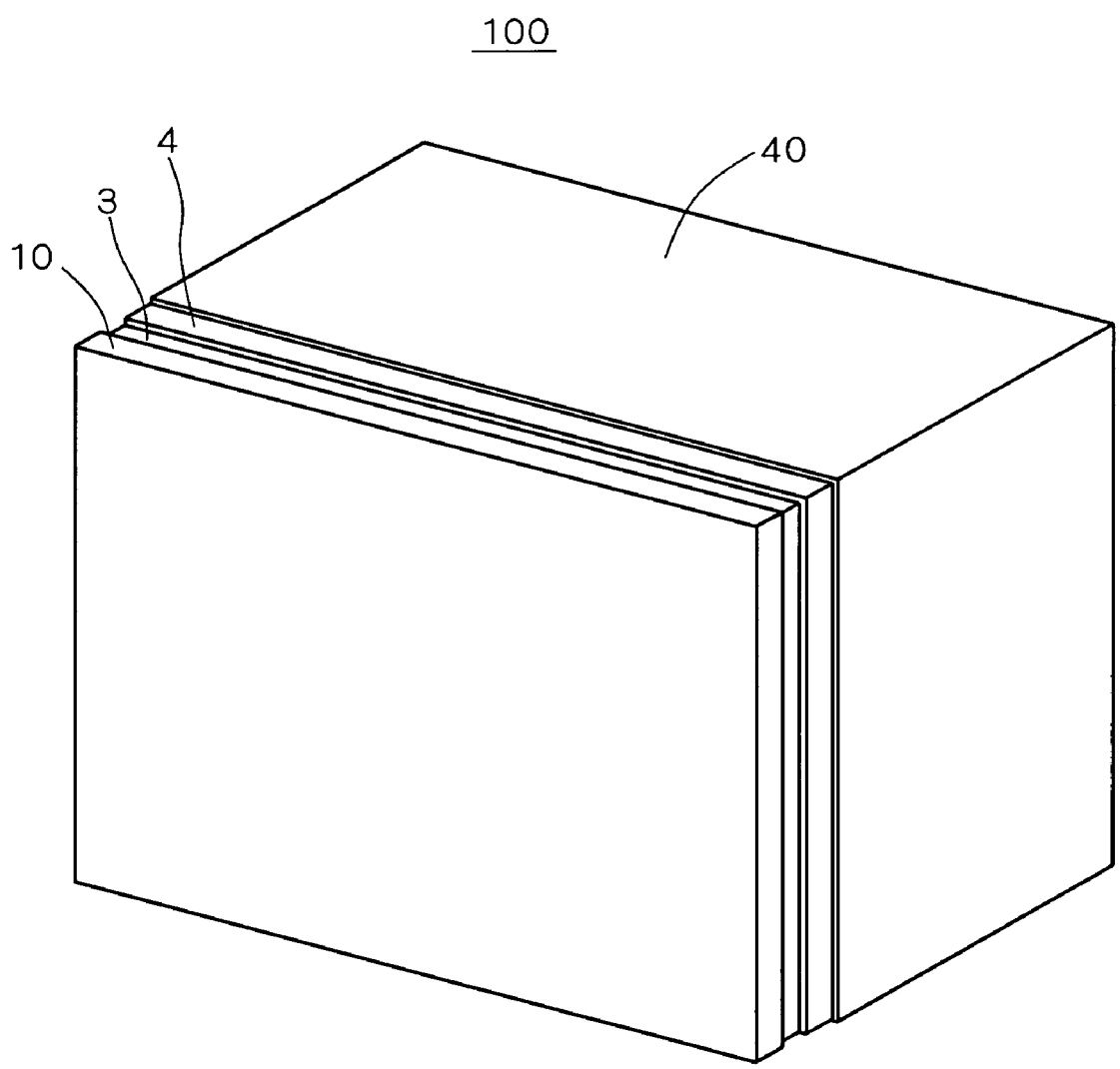

F I G . 7
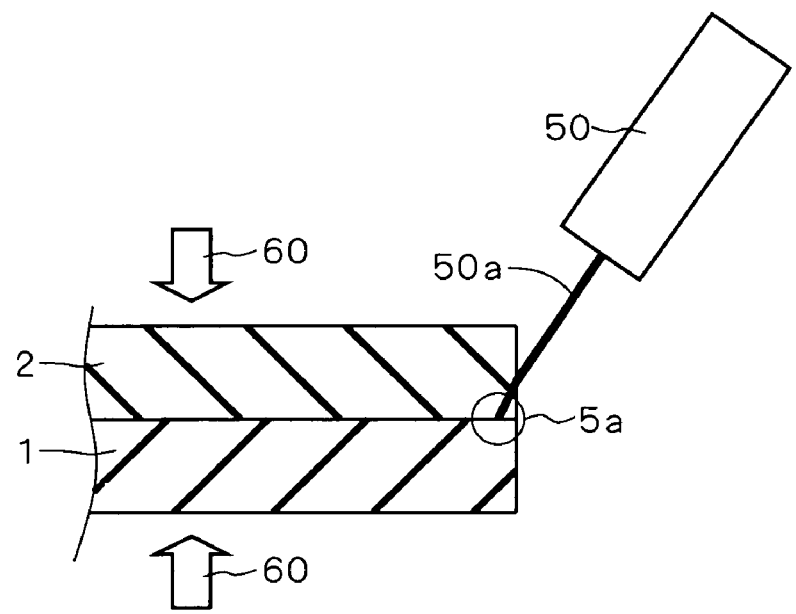
F I G . 8
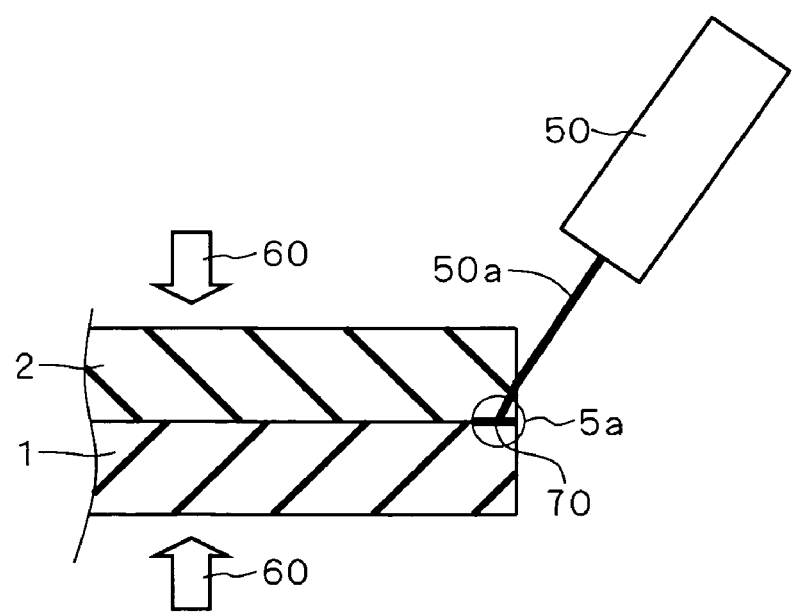

F I G . 1 1
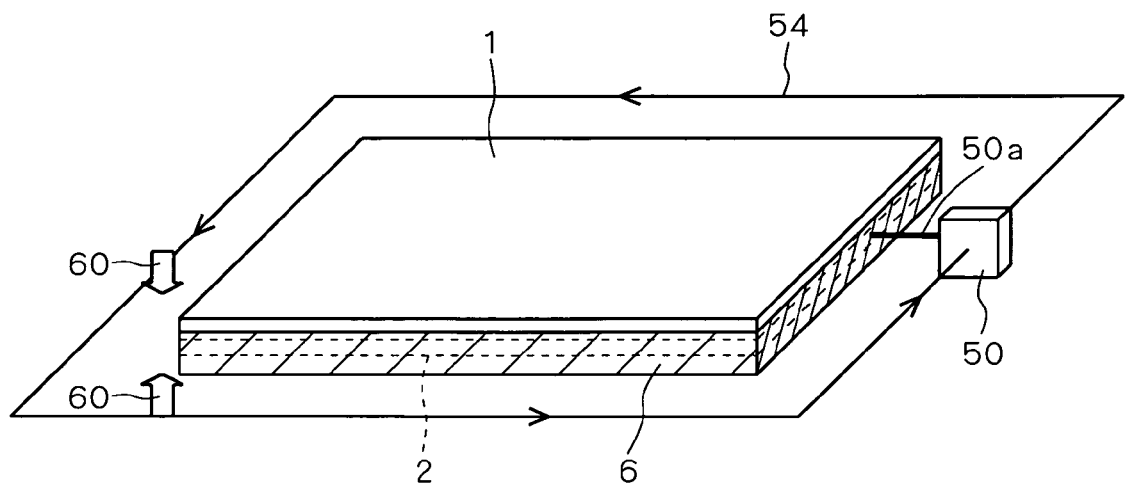
F I G . 1 2
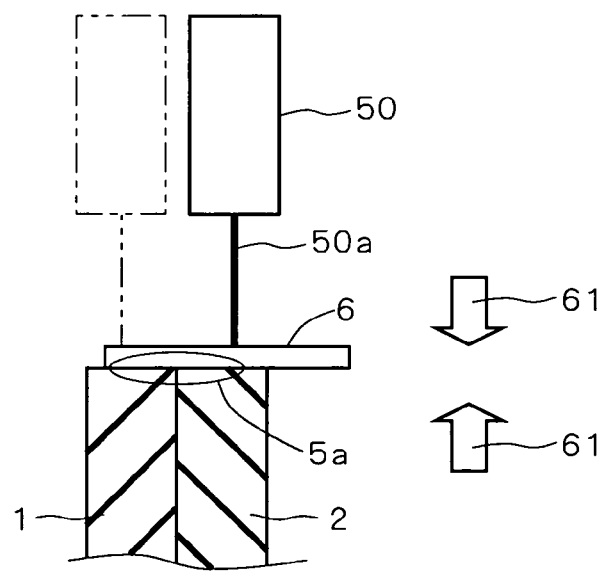

DISPLAY DEVICE, MULTI-SCREEN DISPLAY DEVICE, AND DISPLAY DEVICE MANUFACTURING METHOD

BACKGROUND OF THE INVENTION

1. Field of the Invention

The present invention relates to a display device, a multi-screen display device, and a display device manufacturing method.

2. Description of the Background Art

Display devices using transmitting-type screens are conventionally proposed. For example, Japanese Patent Application Laid-Open Nos. 2001-209129 and 2001-125201 disclose display devices having transmitting-type screens formed of a lenticular lens plate and a Fresnel lens plate.

Also, Japanese Patent Application Laid-Open No. 2004-292247 discloses a technique about a method of bonding glass substrates together.

In a conventional transmitting-type screen, a lenticular lens plate and a Fresnel lens plate may be welded together by using a welding agent. In this case, repeated variations of ambient temperature may distort the welding material to lower the bonding strength between the lenticular lens plate and the Fresnel lens plate.

SUMMARY OF THE INVENTION

An object of the present invention is to enhance the reliability of fixing between a plurality of lens plates forming a screen that displays an image.

According to the present invention, a display device includes a projecting device that outputs image light and a screen that is irradiated with the image light and displays an image. The screen has a first lens plate and a second lens plate that is fixed to the first lens plate by thermal welding.

Also, according to the present invention, a method of manufacturing a display device having a screen that displays an image and has first and second lens plates includes the steps (a) and (b). The step (a) is a step of placing the first lens plate and the second lens plate on each other. The step (b) is a step of, after the step (a), fixing the first lens plate and the second lens plate together by thermal welding using a laser light.

The first lens plate and the second lens plate are thus fixed together by thermal welding. Accordingly, unlike when a welding agent etc. is used to fix the first lens plate and the second lens plate, the fixing strength between the first lens plate and the second lens plate is not lowered by, e.g., repeated distortion of the welding agent caused by temperature variations. That is, the reliability of the fixing between the first lens plate and the second lens plate is enhanced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a perspective view illustrating the structure of the display device of the first preferred embodiment of the invention;

FIG. 7 is an enlarged cross-sectional view showing the method of thermally welding the lenticular lens plate and Fresnel lens plate according to the first preferred embodiment of the invention;

FIG. 8 is an enlarged cross-sectional view showing a modification of the method of thermally welding the lenticular lens plate and Fresnel lens plate according to the first preferred embodiment of the invention;

FIG. 11 is a perspective view showing a method of thermally welding a lenticular lens plate and a Fresnel lens plate according to the second preferred embodiment of the invention;

FIG. 12 is an enlarged cross-sectional view showing the method of thermally welding the lenticular lens plate and Fresnel lens plate according to the second preferred embodiment of the invention;

DESCRIPTION OF THE PREFERRED EMBODIMENTS

First Preferred Embodiment

Figure 1:
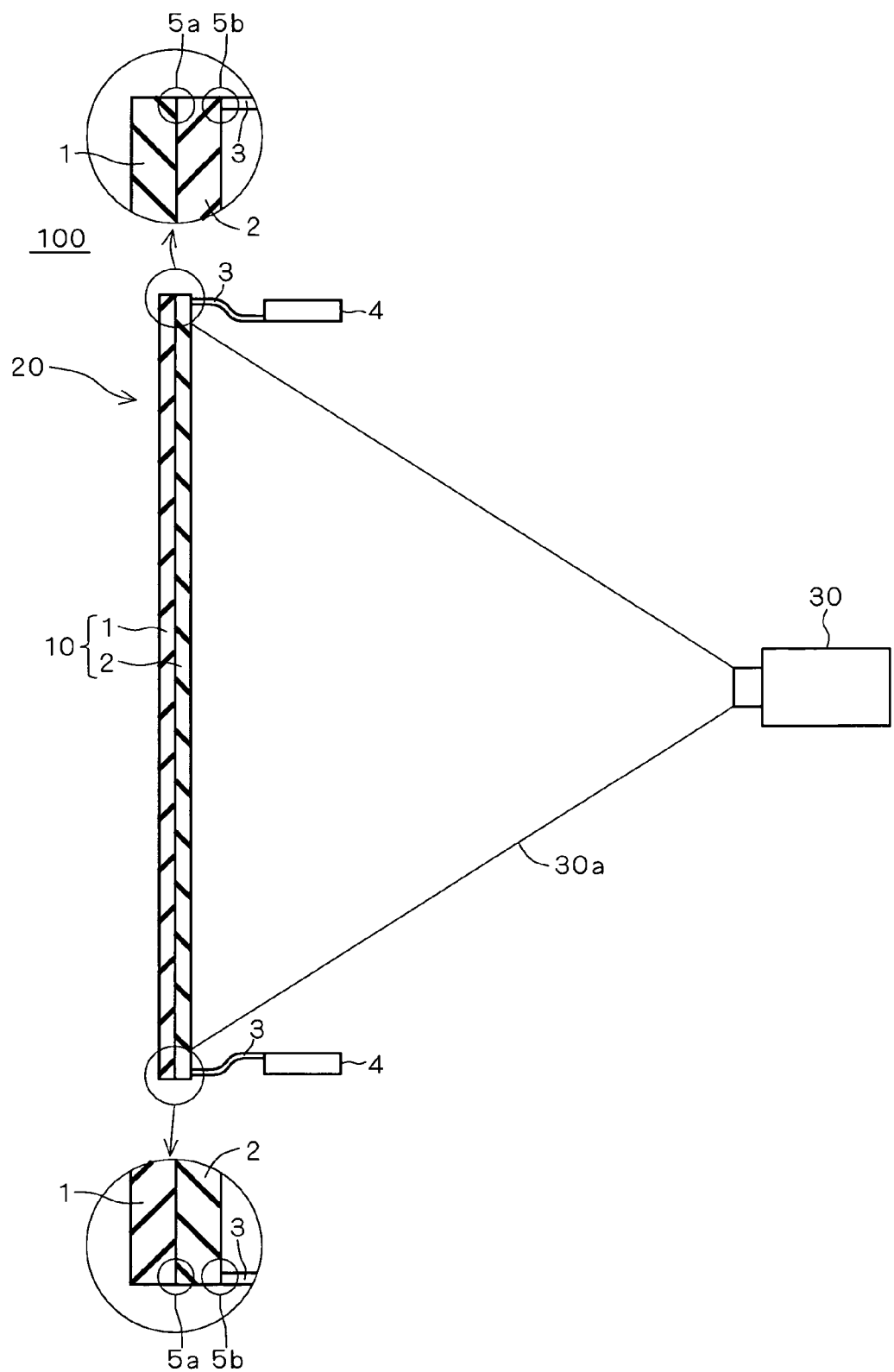
FIG. 1 is a cross-sectional side view illustrating the structure of a display device according to a first preferred embodiment of the present invention.

FIG. 1 is a cross-sectional side view illustrating the structure of a display device 100 according to a first preferred embodiment of the present invention, and FIG. 2 is a perspective view of the structure of the display device 100. In FIG. 1, the housing 40 shown in FIG. 2 is omitted to facilitate the understanding of the internal structure.

As shown in FIGS. 1 and 2, the display device 100 of the first preferred embodiment includes a display unit 20, a projecting device 30, and the housing 40. The projecting device 30, e.g., a projector, is accommodated in the housing 40. The display unit 20 includes a screen 10 that is irradiated with image light 30*a* outputted from the projecting device 30 to display an image, a light shield member 3 that blocks light coming from outside of the display device 100, and a screen frame 4. The screen 10 is composed of a lenticular lens plate 1 and a Fresnel lens plate 2.

The lenticular lens plate 1 and the Fresnel lens plate 2 are put on each other with the lenticular lens plate 1 placed on the side of the viewer and the Fresnel lens plate 2 placed on the side of the projecting device 30. The lenticular lens plate 1 and the Fresnel lens plate 2 are fixed to each other by thermal welding. That is, the lenticular lens plate 1 and the Fresnel lens plate 2 are fixed together through solidification of themselves, without a welding agent put between them. In the first preferred embodiment, the rear surface of the lenticular lens plate 1 (the surface on the projecting device 30 side) and the front surface of the Fresnel lens plate 2 (the surface on the viewer side) are thermally welded together in their peripheral areas. Accordingly, the welded portion 5*a* between the lenticular lens plate 1 and the Fresnel lens plate 2 is formed along the periphery of the rear surface of the lenticular lens plate 1 and the periphery of the front surface of the Fresnel lens plate 2.

In the front surface of the lenticular lens plate 1, a plurality of long and narrow lens portions having arc-like cross-section and a plurality of long and narrow light shield portions are arranged in an alternate manner (neither is shown). The front surface of the Fresnel lens plate 2 has a Fresnel lens (not shown) having a plurality of concentrically arranged grooves.

The light shield member 3 is fixed to the Fresnel lens plate 2 by thermal welding. The welded portion 5*b* between the Fresnel lens plate 2 and the light shield member 3 is formed in the peripheral area of the rear surface of the Fresnel lens plate 2. The light shield member 3 is connected to one opening end of the screen frame 4. The screen frame 4 is attached to the housing 40. The light shield member 3 and the screen frame 4 are connected to each other with, e.g., bolts (not shown).

The lenticular lens plate 1 and the Fresnel lens plate 2 are each made of resin material such as acrylic or polymer of acrylic and styrene. The light shield member 3, too, is made of resin material and contains black dye or carbon black (a pigment) to absorb laser lights. The black dye may be a mixed dye containing phthalocyanine series dye, azo alloy series dye, and anthraquinone series dye, for example.

With the display device 100 constructed as shown above, the image light 30*a* outputted from the projecting device 30 enters the Fresnel lens plate 2, converges in the Fresnel lens plate 2, and enters the lenticular lens plate 1. The lenticular lens plate 1 diffuses the incident image light 30*a* in the horizontal direction. An image is thus displayed on the front surface of the screen 10.

Figure 3:
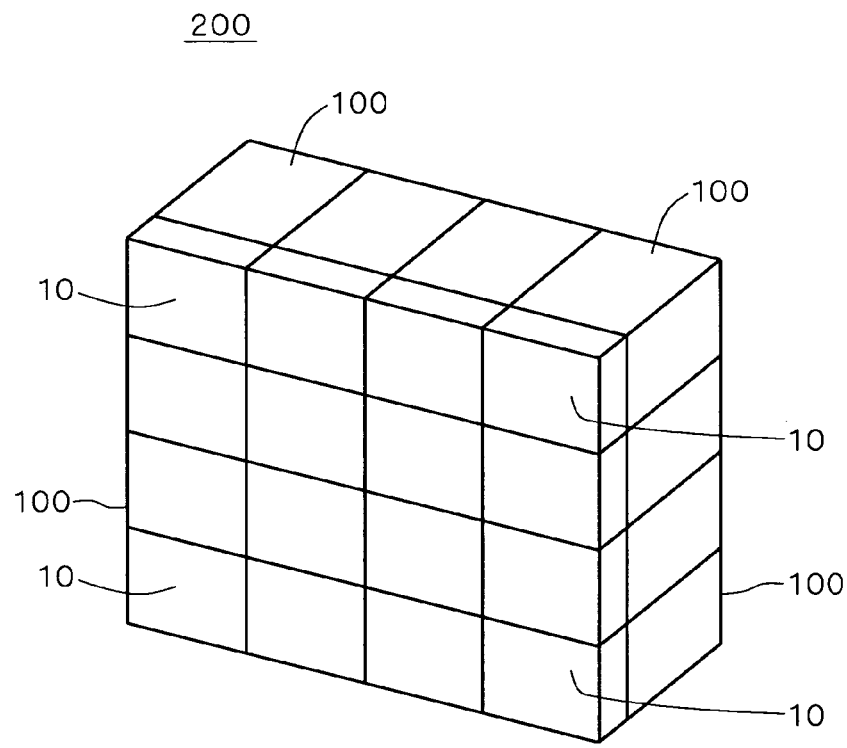
FIG. 3 is a perspective view illustrating the structure of a multi-screen display device according to the first preferred embodiment of the invention.

A plurality of display devices constructed as described in the first preferred embodiment may be combined together to form a multi-screen display device. FIG. 3 is a perspective view illustrating the structure of such a multi-screen display device. As shown in FIG. 3, the multi-screen display device 200 is formed of a plurality of display devices 100 that are arranged so that the front surfaces of their respective screens 10 are positioned in the same plane. The screens 10 of the plurality of display devices 100 are thus combined together to form a single screen.

With the display device 100 of the first preferred embodiment, even when a plurality of display devices 100 are combined together to form the multi-screen display device 200 as shown in FIG. 3, the light shield members 3 that surround the rear surfaces of the screens 10 shield the respective display devices 100 from incidence of light coming from adjacent display devices 100. This prevents stray light and thus prevents deterioration of the quality of displayed images.

Figure 4:
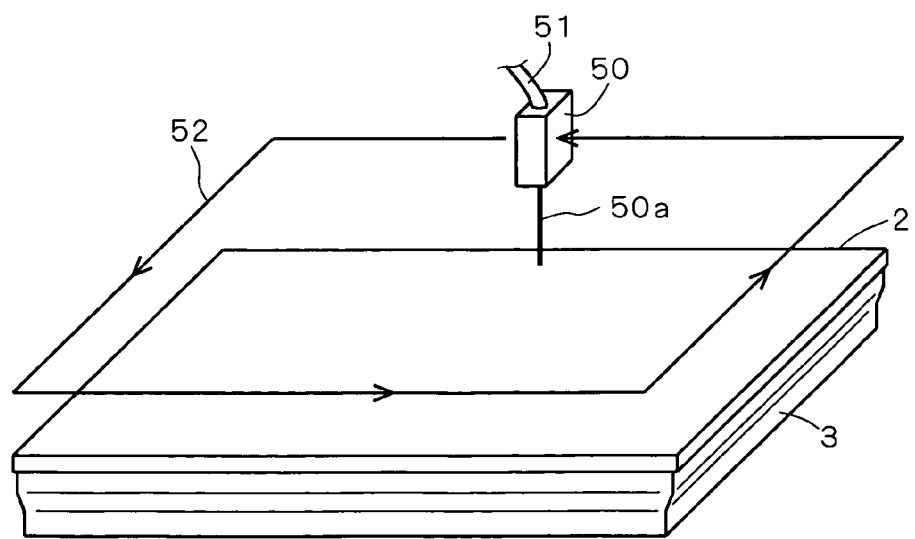
FIG. 4 is a perspective view showing a method of thermally welding a Fresnel lens plate and a light shield member according to the first preferred embodiment of the invention.
Figure 5:
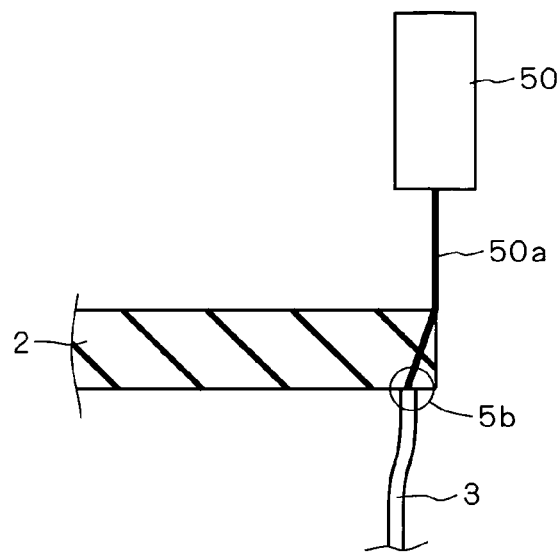
FIG. 5 is an enlarged cross-sectional view showing the method of thermally welding the Fresnel lens plate and light shield member according to the first preferred embodiment of the invention.

Next, a method of thermally welding the Fresnel lens plate 2 and the light shield member 3 will be described. FIG. 4 is a perspective view illustrating the thermal welding method and FIG. 5 is an enlarged cross-sectional partial view of FIG. 4. As shown in FIGS. 4 and 5, the thermal welding of the Fresnel lens plate 2 and the light shield member 3 is achieved by using a laser light 50*a*. A laser head 50 that outputs the laser light 50*a* is connected with a fiber 51, and the fiber 51 is connected to a laser oscillator not shown. The laser light 50*a* generated by the laser oscillator is inputted to the laser head 50 through the fiber 51, and the laser head 50 outputs the laser light 50*a*. The laser light 50*a* may be a semiconductor laser light with an oscillation wavelength from 0.6 μm to 1.5 μm, or may be a solid-state laser light such as YAG laser with an oscillation wavelength in the same range, for example.

In the thermal welding of the Fresnel lens plate 2 and the light shield member 3, first, the Fresnel lens plate 2 and the light shield member 3 are brought into contact with each other and the Fresnel lens plate 2 and the light shield member 3 are pressured in such a direction as to increase the contact strength between them. Then, in this condition, the laser head 50 is moved above the periphery of the Fresnel lens plate 2. In FIG. 4, the arrow 52 shows the direction in which the laser head 50 is moved. The laser light 50*a* outputted from the laser head 50 thus moves while being directed to the periphery of the Fresnel lens plate 2. The laser head 50 is moved by a robot not shown.

As shown in FIG. 5, the laser light 50*a* directed to the Fresnel lens plate 2 is refracted at the plane of incidence where the laser light 50*a* enters the Fresnel lens plate 2, and most of which passes through the Fresnel lens plate 2 to reach the plane of the light shield member 3 that abuts on the Fresnel lens plate 2. The light shield member 3 of the first preferred embodiment has a function of absorbing the laser light 50*a*, and so the light shield member 3 is heated and melted by the energy of the absorbed laser light 50*a*. Also, the heat generated in the light shield member 3 is transmitted to the Fresnel lens plate 2 that is in contact with the light shield member 3, and so the Fresnel lens plate 2 is also heated and melted. Thus, both of the Fresnel lens plate 2 and the light shield member 3 become molten in the portion where they abut on each other, and then they cool and solidify to bond together.

Because the laser light 50*a* is refracted at the Fresnel lens plate 2, the position of emission of the laser light 50*a* to the Fresnel lens plate 2 is determined by considering the refraction.

Figure 6:
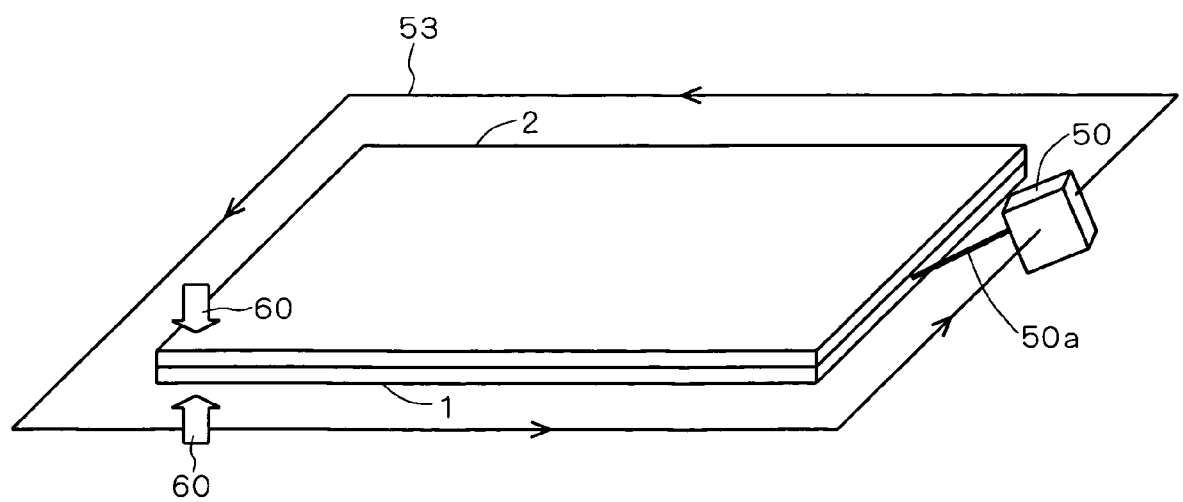
FIG. 6 is a perspective view showing a method of thermally welding a lenticular lens plate and the Fresnel lens plate according to the first preferred embodiment of the invention.

Next, a method of thermally welding the lenticular lens plate 1 and the Fresnel lens plate 2 will be described. FIG. 6 is a perspective view illustrating the thermal welding method and FIG. 7 is an enlarged cross-sectional partial view of FIG. 6. The thermal welding of the lenticular lens plate 1 and the Fresnel lens plate 2 is also achieved by using the laser light 50*a*.

First, as shown in FIG. 6, the lenticular lens plate 1 and the Fresnel lens plate 2 are put on each other, with the Fresnel lens plate 2 placed above. Then, with a pressurizing mechanism not shown, a pressure 60 is applied to the lenticular lens plate 1 and the Fresnel lens plate 2 in such a direction as to increase the contact strength between them. Next, with the lenticular lens plate 1 and the Fresnel lens plate 2 being pressurized in this way, the laser head 50 is moved along the sides of the lenticular lens plate 1 and the Fresnel lens plate 2. In FIG. 6, the arrow 53 shows the direction in which the laser head 50 is moved. In this process, as shown in FIG. 7, the position and inclination of the laser head 50 is controlled so that the laser light 50a is incident on the side of the Fresnel lens plate 2 obliquely from above. Then, the laser light 50a outputted from the laser head 50 is refracted at the side of the Fresnel lens plate 2, enters the Fresnel lens plate 2, and then advances to the lenticular lens plate 1.

Most of the laser light 50a entering the Fresnel lens plate 2 passes through the Fresnel lens plate 2 and hits the above-mentioned light shield portions (not shown) in the peripheral area of the lenticular lens plate 1. Because the light shield portions are capable of absorbing the laser light 50a, the light shield portions are heated and melted by the energy of the absorbed laser light 50a. The heat generated in the light shield portions is also transmitted to the Fresnel lens plate 2 and so the Fresnel lens plate 2 is also heated and melted. Thus, both of the lenticular lens plate 1 and the Fresnel lens plate 2 become molten in their peripheral areas and then cool and solidify to bond together. As shown in FIG. 8, a black dye 70 that absorbs the laser light 50a may be applied to the peripheral area of the rear surface of the lenticular lens plate 1 and the peripheral area of the front surface of the Fresnel lens plate 2 in order to more efficiently absorb the energy of the laser light 50a in the welding of the lenticular lens plate 1 and the Fresnel lens plate 2. In this case, the laser light absorbing dye is present in the welded portion 5a. The black dye may be a mixed dye containing phthalocyanine series dye, azo alloy series dye, and anthraquinone series dye, for example.

Figure 9:
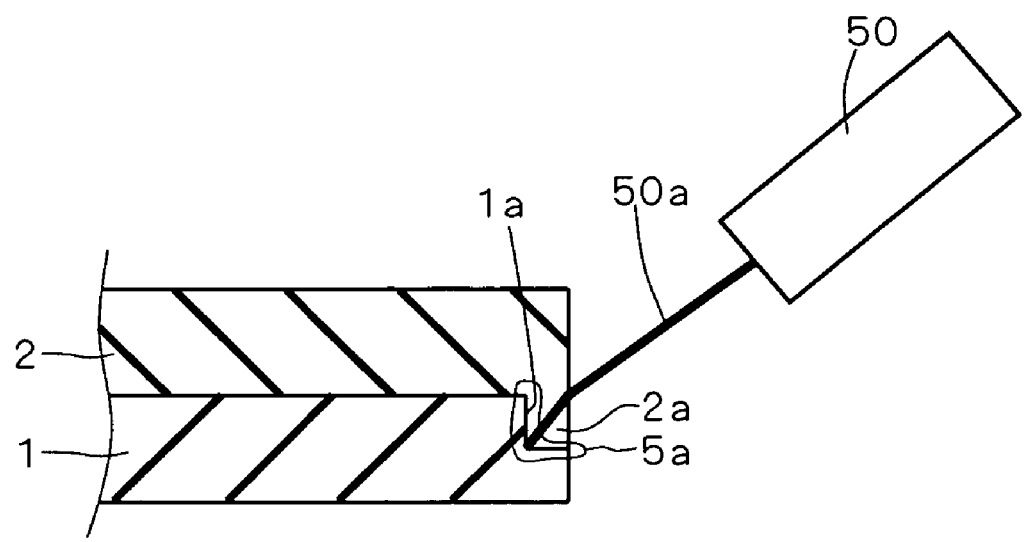
FIG. 9 is an enlarged cross-sectional view showing a modification of the method of thermally welding the lenticular lens plate and Fresnel lens plate according to the first preferred embodiment of the invention.

As shown in FIG. 9, a raised portion 2a may be formed at the periphery of the Fresnel lens plate 2 that is in contact with the lenticular lens plate 1, with a recessed portion 1a formed at the periphery of the lenticular lens plate 1 that is in contact with the Fresnel lens plate 2, in which case the raised portion 2a and the recessed portion 1a can be engaged with each other to fit the Fresnel lens plate 2 on the lenticular lens plate 1. Then, because the components themselves pressurize each other, they can be fixed together by laser welding without the need to externally pressurizing them. Also, this increases the area of contact and hence increases the strength of fixing.

As above, according to the display device 100 of the first preferred embodiment, the lenticular lens plate 1 and the Fresnel lens plate 2 are fixed together by thermal welding. Accordingly, while the use of a welding agent to bond the lenticular lens plate 1 and the Fresnel lens plate 2 may cause deterioration of the fixing strength between the lenticular lens plate 1 and the Fresnel lens plate 2 because the welding agent is repeatedly distorted as temperature varies, the display device 100 of the first preferred embodiment is free from this problem. This enhances the reliability of the fixing between the lenticular lens plate 2 and the Fresnel lens plate 2, i.e., the fixing of the display device 100.

Also, as shown in FIG. 3, a multi-screen display device with high reliability is provided by combining a plurality of display devices 100 of the first preferred embodiment in such a way that the plurality of screens 10 form a single screen of the multi-screen display device.

When the light shield member 3 and the screen 10 are connected together using members like metal fittings, unlike in the first preferred embodiment, and a plurality of display devices 100 are combined together to form a multi-screen display device 200 as shown in FIG. 3, then those members form the joints between the screens 10. Then, a viewer may feel uncomfortable when viewing the single screen displayed over the plurality of screens 10.

However, because the light shield members 3 and the screens 10 are fixed by thermal welding in the first preferred embodiment, there is no need to use members like metal fittings to connect the light shield members 3 and the screens 10, which removes the joints between the screens 10 in the multi-screen display device 200 as shown in FIG. 3. This provides images comfortable to see for the viewers.

Second Preferred Embodiment

Figure 10:
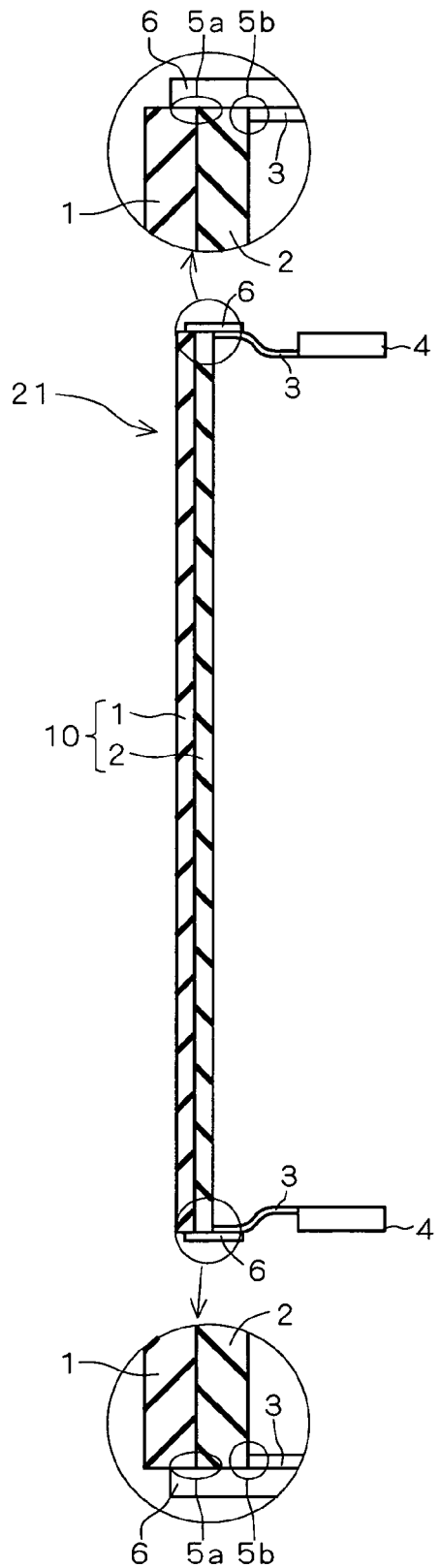
FIG. 10 is a cross-sectional side view illustrating the structure of a display unit according to a second preferred embodiment of the present invention.

FIG. 10 is a cross-sectional side view illustrating the structure of a display unit 21 according to a second preferred embodiment of the present invention. The display unit 21 of the second preferred embodiment is made by further furnishing the display unit 20 of the first preferred embodiment with a laser light absorbing member 6, and is used in place of the display unit 20 in the display device 100 of the first preferred embodiment. A display device 100 of the first preferred embodiment in which the display unit 20 is replaced by the display unit 21 is hereinafter referred to as a display device 100 of the second preferred embodiment.

The laser light absorbing member 6 is capable of absorbing the laser light 50a that is used to thermally weld the lenticular lens plate 1 and the Fresnel lens plate 2. The laser light absorbing member 6 is a sheet-like member having a thickness of 1 mm or less, where a black dye that absorbs the laser light 50a is applied on the inner side of its base material. The black dye may be a mixed dye containing phthalocyanine dye, azo alloy dye, and anthraquinone dye, for example.

The laser light absorbing member 6 is placed in contact with the half area of the sides of the lenticular lens plate 1 that is closer to the Fresnel lens plate 2, the sides of the Fresnel lens plate 2, and the outer side of the light shield member 3, and is fixed by thermal welding to the sides of the lenticular lens plate 1 and the Fresnel lens plate 2 and the outer side of the light shield member 3.

In FIG. 10 and in FIGS. 12 to 14 described later, the welded portion 5a includes a welded portion between the lenticular lens plate 1 and the Fresnel lens plate 2 and a welded portion between the laser light absorbing member 6 and the screen 10. Also, the welded portion 5b includes a welded portion between the screen 10 and the light shield member 3 and a welded portion between the laser light absorbing member 6 and the light shield member 3. In other respects, the structure of the display unit 21 of the second preferred embodiment is the same as that of the display unit 20 of the first preferred embodiment and therefore not described here again.

Next, a method of thermally welding together the lenticular lens plate 1 and the Fresnel lens plate 2 according to the second preferred embodiment will be described. FIG. 11 is a perspective view illustrating the thermal welding method and FIG. 12 is an enlarged cross-sectional partial view of FIG. 11. The thermal welding of the lenticular lens plate 1 and the Fresnel lens plate 2 is achieved by radiation of the laser light 50a to the laser light absorbing member 6.

First, as shown in FIG. 11, the lenticular lens plate 1 and the Fresnel lens plate 2 are put on each other with the lenticular lens plate 1 placed above, and the laser light absorbing member 6 is placed on their sides to surround them. Then, as in the first preferred embodiment, a pressure 60 is applied to the lenticular lens plate 1 and the Fresnel lens plate 2 in such a direction as to increase the contact strength between them. Also, as shown in FIG. 12, with a pressurizing mechanism not shown, a pressure 61 is applied to the laser light absorbing member 6 and the screen 10 in such a direction as to increase the contact strength between them. In this condition, the laser head 50 is moved along the sides of the lenticular lens plate 1 and the Fresnel lens plate 2. In FIG. 11, the arrow 54 shows the direction in which the laser head 50 is moved. Then, as shown in FIG. 12, the laser light 50a outputted from the laser head 50 is directed to the laser light absorbing member 6 and absorbed by the laser light absorbing material provided on the inner side. While emitting the laser light 50a to the laser light absorbing member 6, the laser head 50 first moves around the sides of the lenticular lens plate 1 and then moves around the sides of the Fresnel lens plate 2.

As the laser light absorbing member 6 absorbs the laser light 50a, the laser light absorbing member 6 is heated and melted by the energy of the laser light 50a. Also, the heat generated in the laser light absorbing member 6 is transmitted to the lenticular lens plate 1 and the Fresnel lens plate 2, so as to heat and melt the lenticular lens plate 1 and the Fresnel lens plate 2. Thus, in the contact area between the laser light absorbing member 6, the lenticular lens plate 1, and the Fresnel lens plate 2, they become molten and then cool and solidify to bond together. In this way, the lenticular lens plate 1 and the Fresnel lens plate 2 are fixed together by thermal welding, and the laser light absorbing member 6 and the screen 10 are also fixed together by thermal welding.

While FIGS. 11 and 12 do not show the light shield member 3, the thermal welding of the laser light absorbing member 6, the lenticular lens plate 1, and the Fresnel lens plate 2 is done after the thermal welding of the Fresnel lens plate 2 and the light shield member 3. Then, when the laser light absorbing member 6 is thermally welded to the screen 10, the heat generated in the laser light absorbing member 6 is transmitted to the light shield member 3, whereby the laser light absorbing member 6 and the light shield member 3 both melt, cool, and solidify, and bond together.

As above, according to the second preferred embodiment, the laser light absorbing member 6 is provided on the sides of the lenticular lens plate 1 and the Fresnel lens plate 2 that form the screen 10. When the laser light 50a is applied to the laser light absorbing member 6, the laser light absorbing member 6 absorbs the laser light 50a and generates heat, and the heat is utilized to thermally weld and fix the lenticular lens plate 1 and the Fresnel lens plate 2.

Also, according to the second preferred embodiment, the laser light absorbing member 6 provided on the sides of the screen 10 is a sheet-like member having a thickness of 1 mm or less. Accordingly, when a plurality of display devices 100 of the second preferred embodiment are combined together as shown in FIG. 3 to form a multi-screen display device, the laser light absorbing members 6 do not form the joints between the screens 10 and so the viewer does not feel uncomfortable when viewing the single screen displayed over the plurality of screens 10.

Also, according to the second preferred embodiment, from the standpoint of the method of manufacturing the display device 100, the laser light 50a is directed to the laser light absorbing member 6 placed on the sides of the lenticular lens plate 1 and the Fresnel lens plate 2, and the laser light absorbing member 6 absorbs the laser light 50a and generates heat. The heat is then utilized to thermally weld and fix the lenticular lens plate 1 and the Fresnel lens plate 2.

Also, the laser light absorbing member 6 and the light shield member 3 are fixed together by laser welding through melting and solidification. While welding agents may be repeatedly distorted by temperature variations and may lower the fixing strength between the laser light absorbing member 6 and the light shield member 3, the laser light absorbing member 6 and the light shield member 3 of the second preferred embodiment are free from this problem, whereby the reliability of the fixing between the components is enhanced.

Now, the lenticular lens plate 1 absorbs the laser light 50a, though slightly, and the absorption generates heat. The heat melts the portion of the lenticular lens plate 1 that abuts on the Fresnel lens plate 2, and is also transmitted to the Fresnel lens plate 2 and melts the Fresnel lens plate 2. After that, both of the lenticular lens plate 1 and the Fresnel lens plate 2 solidify and bond together. Accordingly, it is not essential to apply the laser light absorbing material, such as black dye, to the surface area of the laser light absorbing member 6 that is in contact with the lenticular lens plate 1.

In the display device 100 of the second preferred embodiment, in view of certainly blocking stray light, it is preferable to connect the laser light absorbing member 6 and the light shield member 3 by providing black tape at the border between the two.

Figure 13:
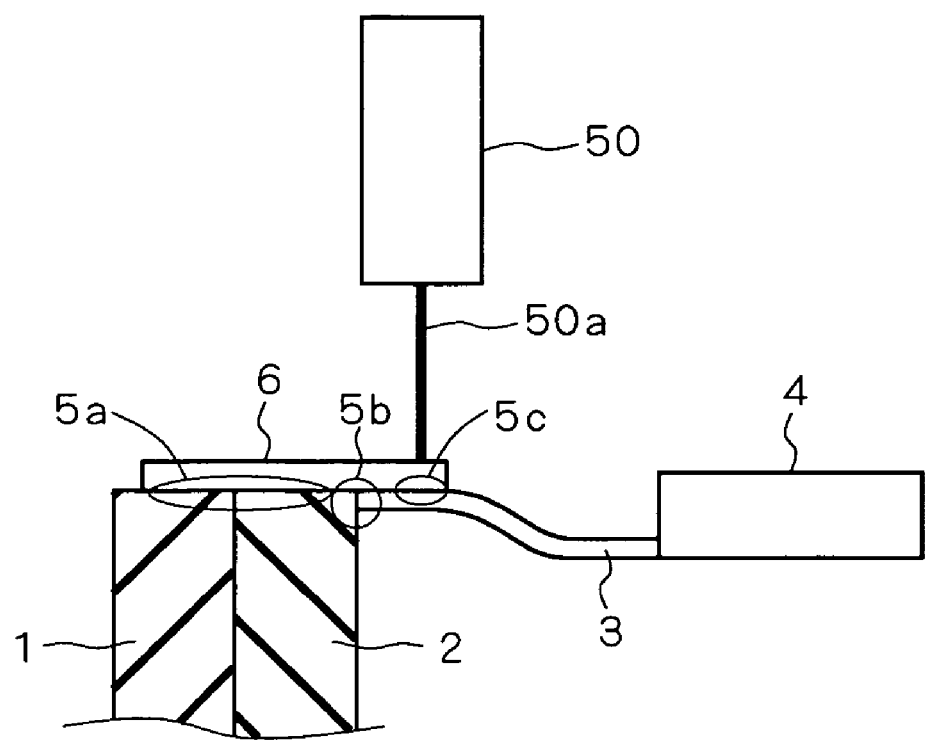
FIG. 13 is an enlarged cross-sectional view showing a method of thermally welding the laser light absorbing member and light shield member according to the second preferred embodiment of the invention.
Figure 14:
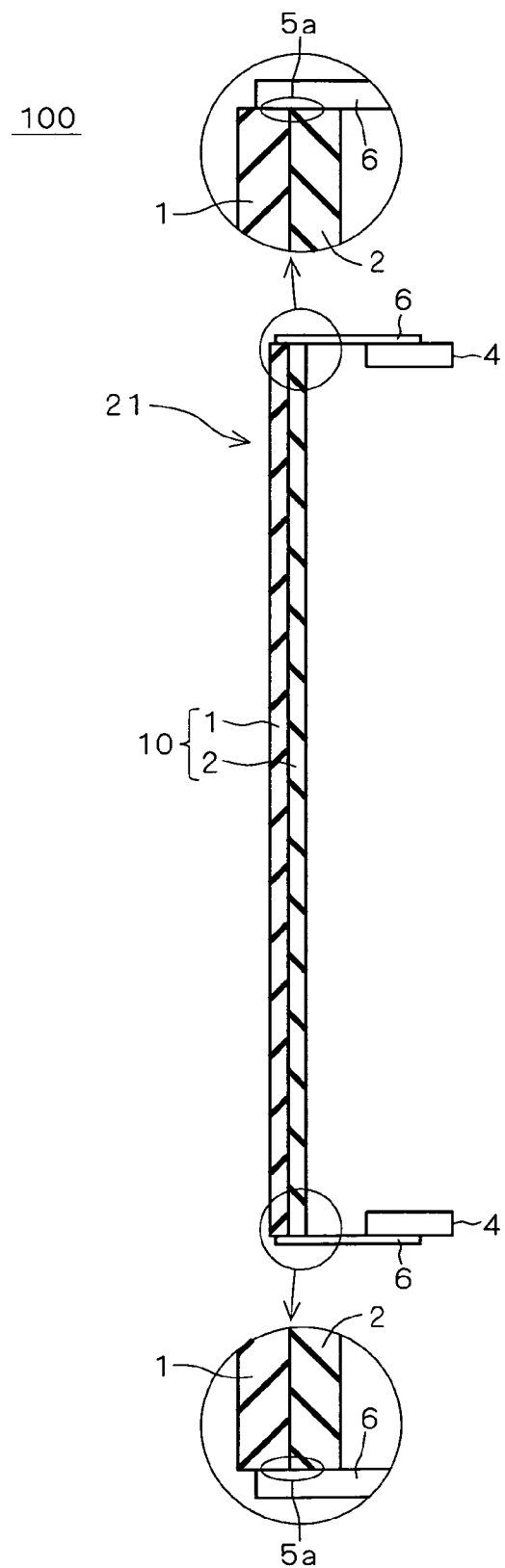
FIG. 14 is a cross-sectional side view illustrating a modification of the structure of the display unit of the second preferred embodiment of the invention.

Also, as shown in FIG. 13, the laser light 50a may be applied directly to the portion of the laser light absorbing member 6 that abuts on the light shield member 3, so as to thermally weld and fix the laser light absorbing member 6 and the light shield member 3. In this case, the laser light absorbing member 6 is melted by heat generated by absorption of the laser light 50a, and the light shield member 3 is melted by conduction of the heat generated in the laser light absorbing member 6 and also by heat generated by part of the radiation of the laser light 50a that was not absorbed in the laser light absorbing member 6. The welded portion 5c between the laser light absorbing member 6 and the light shield member 3 is formed along the inner side of the laser light absorbing member 6 and the outer side of the light shield member 3.

While the second preferred embodiment uses the light shield member 3, the laser light absorbing member 6 is also capable of blocking light coming from outside of the display device 100, i.e., the laser light absorbing member 6 functions also as a light shield member. Accordingly, as shown in FIG. 14, the laser light absorbing member 6 may be connected directly to the screen frame 4 with, e.g., bolts not shown, without using the light shield member 3. This simplifies the manufacturing process and enhances the work efficiency.

Third Preferred Embodiment

Figure 15:
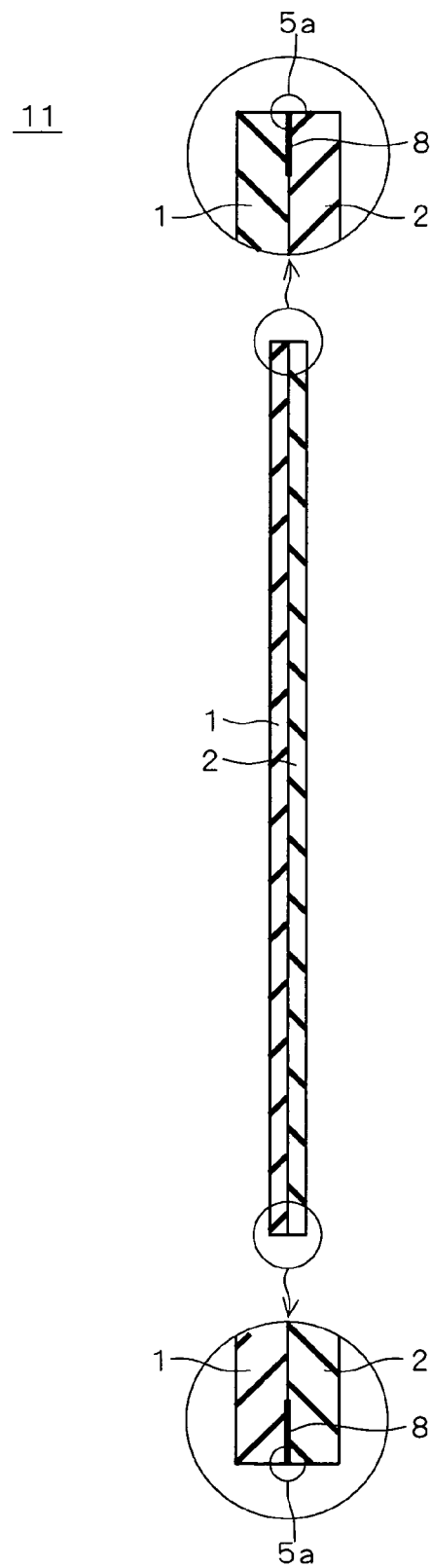
FIG. 15 is a cross-sectional side view illustrating the structure of a screen according to a third preferred embodiment of the invention.

FIG. 15 is a cross-sectional side view illustrating the structure of a screen 11 according to a third preferred embodiment. The screen 11 of the third preferred embodiment is used in the display device 100 of the first preferred embodiment in place of the screen 10. A display device 100 of the first preferred embodiment that uses the screen 11 in place of the screen 10 is hereinafter referred to as a display device 100 of the third preferred embodiment.

As shown in FIG. 15, the screen 11 of the third preferred embodiment includes a lenticular lens plate 1 and a Fresnel lens plate 2, and a metal paste 8 applied between them. The lenticular lens plate 1 and the Fresnel lens plate 2 of the third preferred embodiment are made not of resin material but of glass material.

The metal paste 8 contains metal such as chromium or nickel and is applied to the peripheral area of the rear surface of the lenticular lens plate 1 and the peripheral area of the front surface of the Fresnel lens plate 2. The metal paste 8 is present in the welded portion 5a between the lenticular lens plate 1 and the Fresnel lens plate 2. In other respects, the structure of the screen 11 of the third preferred embodiment is the same as that of the screen 10 of the first preferred embodiment and therefore not described here again.

Figure 16:
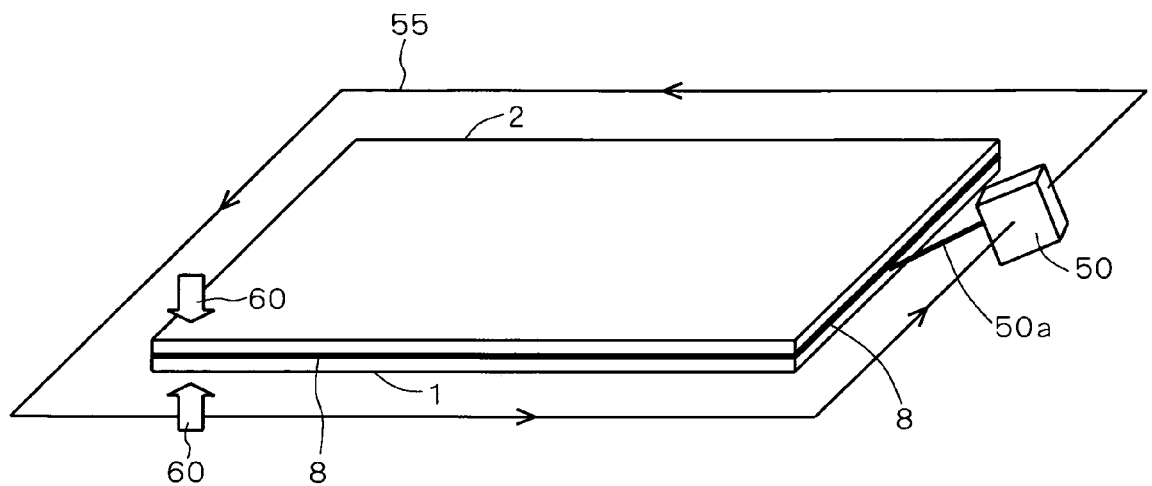
FIG. 16 is a perspective view showing a method of thermally welding a lenticular lens plate and a Fresnel lens plate according to the third preferred embodiment of the invention.
Figure 17:
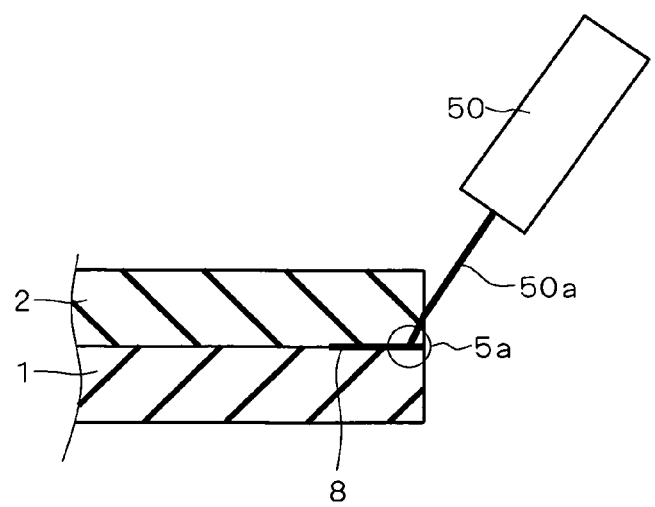
FIG. 17 is an enlarged cross-sectional view showing the method of thermally welding the lenticular lens plate and Fresnel lens plate according to the third preferred embodiment of the invention.

Next, a method of thermally welding the lenticular lens plate 1 and the Fresnel lens plate 2 according to the third preferred embodiment will be described. FIG. 16 is a perspective view illustrating the thermal welding method and FIG. 17 is an enlarged cross-sectional partial view of FIG. 16. The thermal welding of the lenticular lens plate 1 and the Fresnel lens plate 2 is achieved by directing the laser light 50a to the metal paste 8.

First, as shown in FIG. 16, the lenticular lens plate 1 and the Fresnel lens plate 2 are put on each other, with the Fresnel lens plate 2 placed above, and with the metal paste 8 applied between them. Then, as in the first preferred embodiment, a pressure 60 is applied to the lenticular lens plate 1 and the Fresnel lens plate 2 in such a direction as to increase the contact strength between them. Next, in this condition, the laser head 50 is moved along the sides of the lenticular lens plate 1 and the Fresnel lens plate 2. In FIG. 16, the arrow 55 shows the direction in which the laser head 50 is moved. The laser light 50a outputted from the laser head 50 is refracted at the side of the Fresnel lens plate 2, enters the Fresnel lens plate 2, and advances to the metal paste 8 interposed between the lenticular lens plate 1 and the Fresnel lens plate 2.

Most of the laser light 50a entering the Fresnel lens plate 2 passes through the Fresnel lens plate 2 and hits the metal paste 8. The metal paste 8 is heated by the laser light 50a and the heat generated in the metal paste 8 is transmitted to both of the lenticular lens plate 1 and the Fresnel lens plate 2 and melts the two lens plates. After that, the lenticular lens plate 1 and the Fresnel lens plate 2 both cool and solidify to bond together.

As above, according to the third preferred embodiment, the metal paste 8 is put in the welded portion 5a between the lenticular lens plate 1 and the Fresnel lens plate 2. The metal paste 8 efficiently converts energy of the laser light 50a into heat and allows melting of glass material having a higher melting point than resin material. This makes it possible to thermally weld and fix the lenticular lens plate 1 and the Fresnel lens plate 2 both made of glass material.

Also, according to the third preferred embodiment, from the standpoint of the method of manufacturing the display device 100, the laser light 50a is applied to the metal paste 8 put between the lenticular lens plate 1 and the Fresnel lens plate 2. As mentioned above, the metal paste 8 efficiently absorbs the laser light 50a and therefore generates a greater amount of heat. Accordingly, with the heat generated by the metal paste 8 through the radiation of the laser light 50a, it is possible to melt the lenticular lens plate 1 and the Fresnel lens plate 2 that are made of glass material having relatively high melting point, and then they cool, solidify, and bond to each other.

While the invention has been described in detail, the foregoing description is in all aspects illustrative and not restrictive. It is understood that numerous other modifications and variations can be devised without departing from the scope of the invention.

What is claimed is:

1. A display device comprising:
   a projecting device that outputs image light;
   a screen that is irradiated with said image light and displays an image,
   a light shield member for blocking light coming from outside of the display device, wherein
   said screen comprises a first lens plate and a second lens plate that is fixed to said first lens plate by thermal welding and wherein said light shield member is fixed to said second lens plate by thermal welding, and
   a laser light absorbing member, abutting on the light shield member, placed on sides of said first and second lens plates, wherein the laser light absorbing member is configured to absorb laser light that is used for thermal welding of the first lens plate, second lens plates, and the light shield member.

2. The display device according to claim 1, wherein said laser light absorbing member is a sheet-like member having a thickness of 1 mm or less.

3. The display device according to claim 1, further comprising a laser light absorbing dye placed in a welded portion between said first and second lens plates.

4. The display device according to claim 1, wherein
   said first and second lens plates are each made of a glass material, and
   a metal paste is present in a welded portion between said first lens plate and said second lens plate.

5. The display device according to claim 1, wherein
   said first lens plate is a lenticular lens plate, and
   said second lens plate is a Fresnel lens plate.

6. A multi-screen display device that comprises a plurality of the display devices of claim 1, wherein said screens of said plurality of display devices are combined together to form a single screen.

7. The display device according to claim 1, wherein said first lens plate includes a recessed portion formed at the periphery of the first lens plate and said second lens plate includes a raised portion formed at the periphery of the second lens plate, wherein said recessed portion is fixed with said raised portion by thermal welding.

8. The display device according to claim 1, wherein the laser light absorbing member is placed in contact with a substantially half area of the sides of the first lens plate that is closer to the second lens plate, the sides of the second lens plate, and the outer side of the light shield member.

9. A method of manufacturing a display device having a screen that displays an image and has first and second lens plates, comprising the steps of:
   (a) placing said first lens plate and said second lens plate on each other;
   (b) placing a light shield member onto said second lens plate for blocking light coming from outside of the display device;
   (c) placing a laser light absorbing member, abutting on the light shield member, on sides of said first and second lens plates, wherein the laser light absorbing member is configured to absorb a laser light that is used for thermally weld the first lens plate, second lens plates, and the light shield member;
   (d) after said step (c), fixing together said first lens plate and said second lens plate by thermal welding using the laser light; and (e) fixing the light shield member to said second lens plate by thermal welding using the laser light.

10. The display device manufacturing method according to claim 9, wherein said first and second lens plates are each made of a glass material, in said step (a), said first lens plate and said second lens plate are placed on each other with a metal paste interposed therebetween, and in said step (b), the laser light is applied to said metal paste.

11. The display device manufacturing method according to claim 9, wherein said first lens plate includes a recessed portion formed at the periphery of the first lens plate and said second lens plate includes a raised portion formed at the periphery of the second lens plate, and in said step (b), the laser light is applied to the recessed portion and the raised portion.

12. The display device manufacturing method according to claim 9, wherein in said step (c), the laser light absorbing member is placed in contact with a substantially half area of the sides of the first lens plate that is closer to the second lens plate, the sides of the second lens plate, and the outer side of the light shield member.

* * * * *